United States Patent
Zitkus

[11] 3,711,785
[45] Jan. 16, 1973

[54] HIGH POWER SEGMENTED LASER DEVICE HAVING NOVEL COOLANT FLOW ARRANGEMENT AND NOVEL LASER DISCS

[75] Inventor: Wayne J. Zitkus, Toledo, Ohio
[73] Assignee: Owens-Illinois, Inc.
[22] Filed: Sept. 24, 1970
[21] Appl. No.: 75,124

[52] U.S. Cl. .........................331/94.5 O, 331/94.5 D
[51] Int. Cl. ...............................................H01r 3/00
[58] Field of Search......................................331/94.5

[56] References Cited

UNITED STATES PATENTS

| | | | |
|---|---|---|---|
| 3,311,846 | 3/1967 | Simpson et al. | 331/94.5 |
| 3,487,330 | 12/1969 | Gudmundsen | 331/94.5 |
| 3,504,295 | 3/1970 | Chernoch | 331/94.5 |
| 3,569,860 | 3/1971 | Booth | 331/94.5 |
| 3,628,172 | 12/1971 | Matovich et al. | 331/94.5 |
| 3,628,179 | 12/1971 | Cuff | 331/94.5 |

OTHER PUBLICATIONS

Young: "Glass Lasers," Proceeding of the IEEE, Vol. 57, pg. 1281, July 1969.

*Primary Examiner*—William L. Sikes
*Assistant Examiner*—Edward S. Bauer
*Attorney*—Richard D. Heberling and E. J. Holler

[57] ABSTRACT

There is disclosed a laser device in which a plurality of solid laser discs are supported in stacked, spaced relation along their optical axis in an imperforate, elongated tubular member, the discs being planar and having a perimetrical configuration relative to the cross-sectional configuration of the imperforated tubular member such that a coolant admitted to one end of the imperforate tubular member is caused to axially traverse the tubular member in a serpentine or sinuous path across the faces of the discs from one end of the tubular member to the other end. The discs are preferably composed of a solid core of laser materials such as neodymium doped glass and the core is clad by a non-laserable glass material. A feature of the invention is that the discs are maintained in space relation by spacer elements which are inserted in closed bores in the clad portions or non-active medium portions of the discs. Preferably, although not necessarily, the discs are cut from a solid rod of material and at Brewster's angle so that when mounted in the tube, the discs will be at Brewster's angle. Some of the laser discs are relieved at alternate side portions thereof in the glass cladding to form righthand or lefthand members, each being alternated in the stacks to form the serpentine path for coolant to flow. In order to lower the pressure drop with respect to the coolant fluid flowing through the tube, in addition to lefthanded and righthanded laser discs as in the prior art, the invention features neutral discs which are inserted between left and right-hand elements so as to provide at least one parallel path flow for the coolant fluid in its serpentine flow throughout the length of the imperforate tube.

2 Claims, 10 Drawing Figures

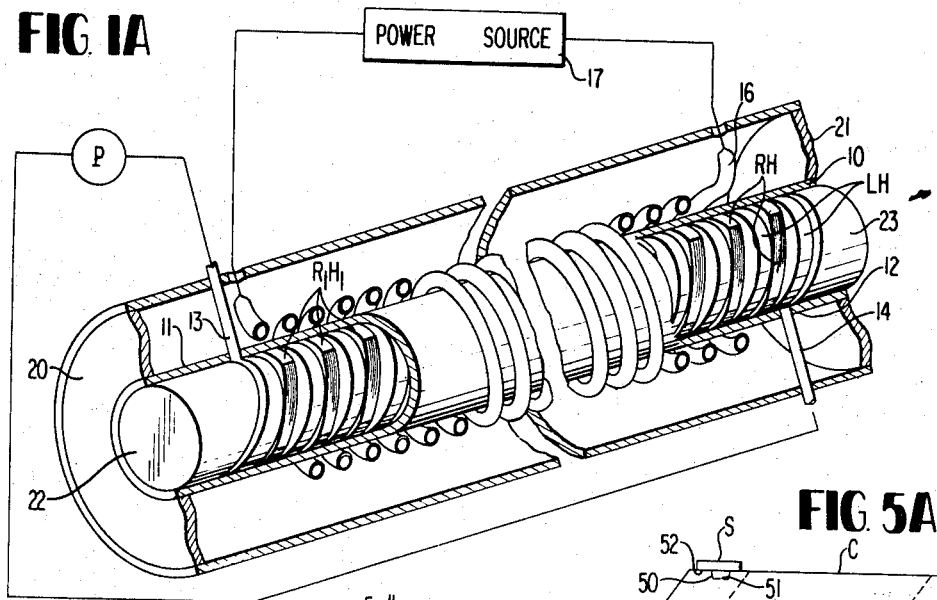

HIGH POWER SEGMENTED LASER DEVICE HAVING NOVEL COOLANT FLOW ARRANGEMENT AND NOVEL LASER DISCS

BACKGROUND OF THE INVENTION AND PRIOR ART

The present invention is directed to improvements in cooling arrangements for laser devices of the laser segment type e.g. disc type lasers. As is known, a laser device may be comprised of a plurality of laser discs oriented at Brewster's angle with spacing between the discs to permit a coolant fluid to flow therethrough. Generally, in the prior art the fluid is caused to flow in a parallel path through each of the spaces between the various laser segments. In some cases, the laser discs are mounted on an open coolant manifold; in other cases, the segmented laser discs are mounted in a tubular supporting member which is composed of two tubular portions having a series of grooves or channels on inner faces thereof and a plurality of ducts for passing the coolant therebetween as shown in Gudmunsen U.S. Pat. No. 3,487,330; solid tubes holding laser segments or discs at Brewster's angle are shown in Simpson et al. U.S. Pat. No. 3,311,846; solid discs are also shown in Chernoch et al. U.S. Pat. No. 3,423,693; and clad laser rods are shown in Devlin et al. U.S. Pat. No. 3,087,374. It has also been suggested by others to edge relieve clad laser discs cut at Brewster's angle, to form left and right-handed discs; stacked in alternating fashion in an imperforated tube to cause a serpentine or sinuous flow of coolant through the assembly of discs.

The present invention is an improvement over prior art in that the spacers are integral with the lasing segments and do not impede the passage of pump illumination or vignette the aperture of the laser beam. The laser discs are preferably of the clad type in that they contain a solid core of laserable material surrounded by cladding material or non-active glass, for example. As taught by others, the discs per se are provided with relieved or removed portions which are relieved in part to form right and left-hand sections, respectively, so that when stacked up in the imperforated tube or support element, coolant fluid which is caused to flow from the one end of the imperforated tube to the other end thereof flows in a sinusoidal or serpentine path. In accordance with one feature of this invention, right and left-hand disc elements may have interposed therebetween neutral elements, which are elements which are relieved on both sides so that a neutral disc interposed between a right and left-handed disc causes the drop in pressure of the coolant fluid to be about half. In accordance with another feature, bores (preferably closed) are formed in the clad area of each disc so as to receive T-shaped spacer elements which have a leg extending into the closed bore of the non-laserable cladding material and a planar surface abutting the surface of the non-laser cladding material so as to maintain a relatively high degree of uniformity in the parallel spacing between the disc elements.

The object of the invention is to provide an improved cooling arrangement for high power laser assemblies and to provide laser discs for making laser devices of any desired power and/or configuration (folded, etc.). The above and other objects, advantages and features of the invention will become more apparent from the following specification taken in conjunction with the accompanying drawings wherein:

FIG. 1a is a partially cross-sectional perspective view of one known laser assembly, and FIG. 1b is a cross-sectional (slightly simplified) view of FIG. 1a, and FIG. 1c is a cross-sectional view of an embodiment thereof incorporating the invention, FIGS. 2a and 2b are side and top plan (at Brewster's angle) views of a laser disc and present exemplary dimensions of a typical righthanded laser disc as used in the invention, FIGS. 3a and 3b are side and top views similar to FIGS. 2e and 2b but illustrating a lefthanded laser element, FIG. 4 is a view similar to FIGS. 2b and 3b and illustrates a neutral disc element for use in the invention as illustrated in FIG. 1c, FIG. 5a illustrates the location and mounting holes of the spacer elements with respect to the cladded material in a given laser disc, and FIG. 5b is included for purposes of explaining manner of making the spacer elements for use in conjunction with the laser discs.

Referring now to the drawings in detail, FIG. 1 illustrates one embodiment of the prior art using righthanded and lefthanded laser discs as illustrated in FIGS. 2a, 2b, and 3a, 3b, respectively. While the laser discs are shown as being cut at Brewster's angle, it will be appreciated that if the coolant fluid and the laser material have identical or closely similar optical characteristics then the discs need not be cut at Brewster's angle. However, as indicated above, it is preferred that the discs be cut at Brewster's angle.

As illustrated in FIG. 1a, tube 10 is provided near its ends 11 and 12, respectively, with means such as pipes 13 and 14 for admitting and removing coolant from the device. The coolant (water, heavy water, freon, Benzene, etc. chosen to avoid undesirable refractions when the discs are not at Brewster's angle) may be forced in a closed cycle by a pump-refrigerant system designated generally by the letter P in FIG. 1a, it being understood that such pump and cooling system per se not forming a part of the present invention. In order to more clearly maintain the focus of the present invention, it should be emphasized that the burden of the present invention is to assure that the coolant fluid flows in a uniform and an unimpeded manner and in a long sinuous, serpentine or tortuous path through the device and across the faces of the laser active elements with a low pressure drop in the fluid flow in a manner to be described more fully hereinafter. Thus, the protions of tube 10 between ends 11 and 12 is fluid tight and imperforated. Mounted within tube 10 are laser discs which, solely for terms of reference, are designated lefthanded disc (lh) and righthanded disc (rh), the lefthanded and righthanded discs in the assembly shown in FIG. 1a being so labeled. Surrounding imperforated tube 10, and in the area of discs rh and lh is a lamp 16, of conventional construction, which is supplied with an operating energy from power source 17, which is likewise conventional. It will be appreciated that instead of helical lamps 16, one or more individual, elongated flash lamps may be arranged about tube 10 and operated in a conventional manner.

Enclosing the assembly just described is an outer cylindrical shell 20 having end pieces 21, the end pieces 21 and the cylindrical shell or tubular member 20 being fluid tight and non-transparent to light and, preferably having a silvered inner surface to form a highly reflective enclosure for the device and for containing a cooling fluid for cooling lamp 16 which may, if desired, be circulated by pump P.

As described generally above, lefthanded (lh) and righthanded (rh) laser disc elements are contained within imperforated tube 10, the elements being alternated, lefthanded disc or element and then righthanded disc or element, or vice versa. End or plug elements 22 and 23, respectively, are mounted in the two ends 11 and 12, respectively, of tube 10 with the faces of plug members 22 and 23 being slanted or configured to correspond to the faces of discs rh and lh, it being understood that in the event the discs are not oriented at Brewster's angle, e.g., have faces normal to the optical axis of the assembly, that the confronting faces of end elements 22 and 23 may be likewise normal to the optical axis of the laser device. The end elements 22 and 23 are preferably of non-active material, as for example, quartz, or, preferably, ED-4 glass as manufactured and sold by the assignee of this invention. Likewise, with respect to imperforate tube element 10 as well as other non-active non-conductive elements disclosed herein.

Referring now to FIG. 2a and FIG. 2b the righthanded (rh) laser disc element will be described in detail, such description being applicable to a lefthanded laser disc element. The laser discs are formed from a solid core 30 of laser medium such as a neodymium doped glass $Nd^{+3}$ which is preferably clad by a non-laserable glass cladding 31 which may be a clear glass marketed as ED-4 glass by the assignee of the present invention. The neodymium doped laser core material 30 may be a glass marketed as ED-2 by the assignee hereof. The glass laser core 30 and the cladding glass 31 are preferably formed as a solid laser rod (not shown) having a solid core of laser material which is clad by the glass cladding. Such a solid rod is then sawn into individual discs and, preferably, although not necessarily, at Brewster's angle as illustrated in the drawing. For optimum performance the surfaces of the discs are ground to be (1) parallel within three seconds of arc, (2) flat within one wave length at 1.06 microns across the core, and (3) polished to less 100A. rms surface roughness. The edges may be chamfered or rounded slightly so as to remove any sharp edges and the material may be an annealed ED-2 laser glass and have a 0.520 inch diameter of neodymium doped material and a concentric cladding of ED-5 glass (overall diameter as shown in the drawings). It should be noted that the discs although illustrated as circular in FIG. 1, are in actuality eliptically configured since they have been cut at Brewster's angle from a solid cylindrical (and circular) rod.

Initially, as thus formed, the discs are identical in all respects. In order to convert a clad disc into a righthanded element as illustrated in FIG. 2, the righthand edge surface is ground to a 0.600 radius, with the center of curvature being ¼ inch from the axis (exemplary dimension) of active material along the minor diameter so as to provide a relieved surface edge 35 which co-acts with the imperforated tube portions 10 to define passageways for the flow of cooling fluid. In a similar fashion, lefthanded discs as shown in FIG. 3a and FIG. 3are formed, the core of active or laserable material being denominated by the numeral 40 and the cladding material being denominated by the numeral 41, and, the relieved or removed surface being denoted by the numeral 45. It will be noted in connection with FIG. 3a that the surface 35 is on the opposite side of the figure from the viewer and the beginning of the relieved surface is indicated in dotted lines at the top and the bottom of the figure. It will be understood that FIG. 3b, like FIG. 2b, is a top elevational view looking along the axis of the core material and as in the case of FIG. 2b, the discs are actually eliptically shaped because of their having been cut at Brewster's angle from a solid right circular cylindrical rod of glass clad laser material.

The discs are maintained in spaced relation by spacer elements S(not shown in FIGS. 1b and 1c). Such spacer elements S are typically illustrated in cross-section in FIG. 5a which shows a laser disc having a core element C clad area CL which correspond, respectively, to cores 30 and 40 and claddings 31 and 41. As shown in FIG. 5a, closed or blind bore holes 50 are drilled, for instance, by ultrasonic drilling means into the cladding material CL and in the spacing positions or orientation illustrated in FIGS. 2b and 3b. It should be emphasized that the particular spacing and orientation illustrated for the spacers S in these two figures is of no great significance except that in connection with the spacer S shown to the left of the axis of righthanded element shown in FIG. 2b (e.g., opposite the relieved surface portion or surface area 35) is spaced so that it will contact the clad area between the surface 45 of the lefthanded section and the beginning of cladded material 40 (the area marked with an X in FIG. 3b).

The spacers S are generally T-shaped elements or pads which include legs or pins 51 having diameters slightly smaller than the diameter of blind bores 50 so that the insertion of legs or pins 51 into blind bores 50 does not produce a friction fit although it is not necessary to completely avoid a friction fit.

Referring now to FIG. 5b, a jig 60 having a plurality of bore holes 61, only one such bore hole being shown, is provided for receiving a plurality of spacer elements S which have a planar under surface 52 abutting the upper surface 62 of jig 60. With a plurality of spacer elements S in such jig, the top surfaces 53 of such spacer element may be ground smooth with the other surface 52 thereof serving as a reference plane so that all such spacer elements have two parallel surfaces spaced by substantially the same distance, e.g. the distance illustrated in FIG. 5b as being 0.015 inch. The diameter of such discs may vary and in a typical case is illustrated with reference to FIG. 2a may be 0.110 inch in diameter, with the diameter of T-shaped element 51 being in the neighborhood of 0.070 inch in diameter.

It will be understood that the dimensions given hereinabove are purely exemplary and they can be varied widely and according to engineering design practices and to vary the size according to the size of laser elements being made. It will likewise be appreciated that various materials other than the glass laser materials and glass cladding as well as glass spacer elements may be incorporated in the invention. For example, ruby laser material clad with clear sapphire material or neodymium doped YAG, etc. may be constructed and fabricated into discs in accordance with the invention. However, in its broader aspects, while the clad disc arrangement disclosed herein is preferred, it will be appreciated that discs of a solid laser material, e.g., unclad laser discs may be provided with relieved portions as is illustrated at edges 35 and 45, respectively, and 65L and 65R (as described more fully hereinafter) without departing from the spirit of the invention.

As illustrated in FIG. 1b, righthanded laser discs and lefthanded laser discs are stacked in alternating fashion, lefthanded disc, righthanded disc, lefthanded disc, righthanded disc, etc., throughout the length of the imperforated tube so that the relieved portions or surface edges 35 of righthand disc elements form with the imperforated wall of tubular member 10 channel or passageways W causing the coolant fluid to flow in a tortuous or serpentine path as indicated generally by the arrows shown in FIG. 1b. Thus, the coolant fluid is caused to flow across the faces of the laserable elements in a generally laminar type flow and then across the opposite face of the disc and, at the same time, across the opposing or adjacent face of the next succeeding element before being caused to traverse an opposite direction and cool the opposite face of the next succeeding disc as well as the opposite face of the next most succeeding disc and so on. The terms "lefthanded" and "righthanded" are merely terms of reference since the "top" and "bottom" edges may be relieved or other terms of reference used.

It will be noted that the spacing between the inner surface of tube 10 and the relieved portions 35 of righthanded discs and relieved portions 45 of lefthanded discs is slightly greater than the spacing between adjacent discs. The reason for this is that because of the curvature of the relieved portions, e.g., the opening or aperture thereat for flow of coolant fluid should be at least equal to or preferably greater than the cross-sectional area of the spacing between adjacent discs including the area taken up by the spacer elements per se. In this way, there is assured laminar flow throughout the length of the tube for the coolant fluid. Moreover, it is assured that the fluid which enters the input means 13 is caused to traverse all of the later or downstream discs to achieve a more uniform cooling of the discs.

In order to assure a relatively low pressure drop to the fluid in its passage through the tube, instead of the discs being alternate right and left-hand sections, the discs may be patterned as right, neutral, left, neutral, right, neutral, left, and so on, as illustrated in FIG. 1c. The neutral elements N are shown in FIG. 4 and, like righthand and lefthand discs rh and lh, respectively, include a solid core 60 of ED-2 laser material clad with cladding 61. The spacers S are identical to the spacers shown in FIGS. 5a except it should be noted that the spacers S are arranged in a generally triangular pattern. This same triangular spacer pattern may be applied to the right and left-handed discs in essentially the same fashion.

In the case of neutral disc N both the lefthanded side 65L and the right-hand side 65R have been ground down on the same radius of curvature as illustrated in connection with FIG. 2b. In this case, when the discs are assembled in the fashion described above, e.g., lefthanded disc, neutral disc, righthanded disc, neutral disc, lefthanded disc, neutral disc, the coolant fluid is caused to traverse along the axial length of tube 10 in pairs of parallel paths transverse to the optical axis thereof at an angle related to Brewster's angle and then in paths W (as seen in FIG. 1b) parallel to the optical axis and then again, in a pair of parallel paths transverse to the optical axis, the transverse paths crossing across the optical axis being along the faces of the laserable material to cool same. To permit even lower pressure drops when desired, more than one neutral disc can be used between the lefthanded and righthanded disc. In longer assemblies, two or three neutral discs are generally preferred.

As described above, the laser discs and the arrangements of the present invention provide a simplified and improved cooling arrangement of the laser elements so as to permit higher power to be utilized therein; to provide an improvement in that spacers are integral so to speak with the laser segments and do not impede the passage of pump illumination, or vignette the aperture of the laser beam. The spacers used herein are chemically, thermally, and optically compatible with the laser segments allowing for increased simplicity resulting in ease of manufacture and assembly. Moreover, as in known segmented laser devices, more or less laser discs may be used in any given arrangement, the tubes with laser discs may be stacked end-to-end or provided with prism devices at their ends so as to provide folded beams and the like, all in manners well known in the art. Moreover, as indicated elsewhere herein, instead of helical lamp, the pump or pump source may comprise an elongated flash tube, one or more arranged about the axis of tube 10.

What is claimed is:

1. In a laser device having a plurality of solid laser discs having parallel faces supported in aligned spaced relation along their optical axis in an imperforate, elongated tubular member, each of said discs comprising an inner solid core of laserable material and an outer cladding of a transparent solid non-laserable material, means for optically pumping said laser discs located adjacent said tubular member, a coolant for cooling said laser discs, a pump for said coolant, and means for admitting said coolant to one end of said member and removing coolant from the other end of said member, said discs being planar and having a perimetrical configuration relative to the cross-sectional configuration of said imperforate tubular member such that the coolant is caused to traverse said tubular member in a serpentine path across the faces and at least one edge of each of said discs from one end of said tubular member to the other end thereof, the improvements comprising,
  a plurality of co-planar but discrete solid, incompressible spacer members between the opposing faces of adjacent discs in said tubular member and having a pair of coplanar surfaces for abutting and spacing planar surfaces of said adjacent disc, each of said spacer members being constituted by a T-shaped member having a leg extended into a bore hole in said non-laserable material and a planar surface abutting the surface of said non-laserable cladding material adjacent said bore hole and a surface parallel to said planar surface for abutting the cladded surface area of an adjacent disc, and means for securing said spacer elements on one planar face surface of each of said discs, respectively each having a dimension and physical location so as to establish uniform flow of coolant fluid across the faces of each disc.

2. The invention of claim 1 wherein there are at least three spacer members between each of said adjacent discs and each of said bore holes is a closed bore.

* * * * *